United States Patent
Jones

(10) Patent No.: US 11,673,739 B2
(45) Date of Patent: Jun. 13, 2023

(54) VACUUM CANISTER SYSTEM AND METHOD

(71) Applicant: Terry G. Jones, Austin, TX (US)

(72) Inventor: Terry G. Jones, Austin, TX (US)

(73) Assignee: EyeVac Holdings, LLC

( * ) Notice: Subject to any disclaimer, the term of this patent is extended or adjusted under 35 U.S.C. 154(b) by 0 days.

(21) Appl. No.: 17/313,523

(22) Filed: May 6, 2021

(65) Prior Publication Data

US 2022/0185581 A1 Jun. 16, 2022

Related U.S. Application Data

(60) Provisional application No. 63/125,505, filed on Dec. 15, 2020.

(51) Int. Cl.
*B65F 1/00* (2006.01)
*B65F 7/00* (2006.01)
*B65F 1/04* (2006.01)

(52) U.S. Cl.
CPC ............... *B65F 1/006* (2013.01); *B65F 1/04* (2013.01); *B65F 7/00* (2013.01); *B65F 2210/179* (2013.01)

(58) Field of Classification Search
CPC .... B65F 1/006; B65F 1/04; B65F 7/00; B65F 2210/179
USPC .................................................. 220/495.04
See application file for complete search history.

(56) References Cited

U.S. PATENT DOCUMENTS

| | | |
|---|---|---|
| 6,199,714 B1 | 3/2001 | Thompson |
| 2002/0152577 A1 | 10/2002 | Moore |
| 2007/0256272 A1 | 11/2007 | Kim |
| 2008/0189898 A1* | 8/2008 | Hughes ................... B65F 1/163 15/310 |
| 2010/0122428 A1* | 5/2010 | Williamson ............ A47L 5/365 15/347 |
| 2010/0139032 A1 | 6/2010 | Tomasiak |
| 2013/0098794 A1* | 4/2013 | Clancy .................. B65F 1/0093 220/745 |
| 2016/0206166 A1* | 7/2016 | Lilley ........................ B03C 3/00 |
| 2018/0134391 A1* | 5/2018 | Spille .................... B65F 1/1405 |
| 2018/0177358 A1* | 6/2018 | Conrad ................. A47L 9/1683 |
| 2018/0251293 A1* | 9/2018 | Glisson .................. A01G 20/43 |
| 2019/0062047 A1* | 2/2019 | Spille .................... B65F 1/1473 |
| 2019/0276230 A1* | 9/2019 | Bilton ................... B65F 1/1646 |

* cited by examiner

*Primary Examiner* — J. Gregory Pickett
*Assistant Examiner* — Niki M Eloshway
(74) *Attorney, Agent, or Firm* — The Langley Law Firm, P.C.

(57) ABSTRACT

A system includes a vacuum canister combinable as a unit with a segregated trash bin. The vacuum canister is connected to a vacuum motor for drawing fines and particulates to the vacuum canister. The segregated trash bin retains refuse separate from the fines and particulates of the vacuum canister. The vacuum canister sealingly contains the fines and particulates from vacuuming. Debris larger than the vacuumed fines and particulates is depositable in the segregated trash bin separated from the fines and particulates.

1 Claim, 6 Drawing Sheets

VACUUM CANISTER SYSTEM AND METHOD

TECHNICAL FIELD

The invention generally relates to cleaning systems for home environment, and more particularly relates to a combination of a vacuum canister for particulates capture in a trash can unit.

BACKGROUND

A conventional trash can when opened, such as to put refuse inside, to empty the can, and otherwise, may release fines and particulates that have been put into the can together with larger refuse. A conventional vacuum, on the other hand, can collect fines and particulates, but it may not collect refuse that is too large for the vacuum.

It would, therefore, be a significant improvement in the art and technology to provide a vacuum canister coupled with a vacuum motor that draws and collects the fines and particulates from dispersion, combined in a unit with a segregated trash can for larger refuse.

SUMMARY

An embodiment of the invention is a vacuum canister, the vacuum canister combined as a unit with a segregated trash can, the vacuum canister coupled to a vacuum motor that draws and collects fines and particulates, and the trash can for depositing larger refuse that is not vacuumed.

Another embodiment of the invention is a system including an enclosure with a hinged lid, a top portion of the enclosure forms a trash bin accessible via the hinged lid, a bottom portion of the enclosure retains a vacuum with an inlet and an outlet and includes a cavity between the inlet and a vacuum motor of the vacuum, and a vacuum canister removably fits in the cavity and seals the bottom portion for vacuuming.

Yet another embodiment of the invention is a method. The method includes vacuuming by a vacuum combined with a trash bin.

Another embodiment of the invention is a method of manufacture including providing an enclosure, providing a hinged lid to the enclosure, providing in a top portion of the enclosure a segregated trash bin accessible via the hinged lid, providing in a bottom portion of the enclosure a segregated vacuum with an inlet and an outlet and a cavity between the inlet and a vacuum motor of the vacuum, and providing a vacuum canister, the vacuum canister removably fits in the cavity and seals the bottom portion for vacuuming.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
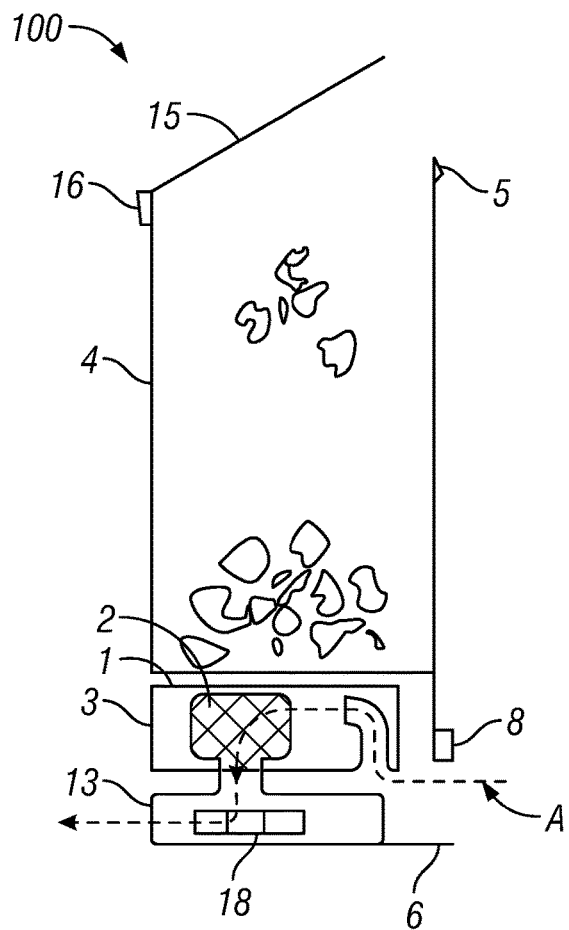
FIG. 1 illustrates a partial cross-sectional side view of a system including a vacuum canister combined as a unit with a segregated trash bin, the vacuum canister coupled with a vacuum motor to draw fines and particulates to the vacuum canister where sealed and prevented from escape, according to certain embodiments of the invention.

Referring to FIG. 1, a system 100 includes a vacuum canister 3, for sealed collection and retention of fines and particulates. The vacuum canister 3 connects between a vacuum air inlet 6 and a vacuum air outlet 13. A vacuum unit 18 connects after the vacuum canister 3, between the inlet 6 and the outlet 13. The vacuum motor 18 draws vacuum in the direction of arrow A by sucking through the inlet 6 and exhausting through the outlet 13. Between the inlet 6 and the outlet 13, the vacuum canister 3 is located to collect fines and particulates vacuumed. A segregated trash bin 4, connectable by the vacuum canister 3 as a unit, collects debris placed into an upper opening of the bin 4, such as debris too large for vacuum. A trash bin lid 15 is hinged at the upper opening of the bin 4 to selectively open and close the bin 4. The vacuum canister 3 is a sealed container for holding fines and particulates that would otherwise disperse if deposited in the trash bin 4, for example, when the trash bin 4 is opened, emptied or otherwise.

The vacuum canister 3 contains a void which is closed by a canister lid 1. Within the void of the canister 3 a pre-motor filter 2 is positioned between a canister inlet 30 (shown in FIG. 3 to the canister 3) connected to a vacuum inlet 6 and to an outlet to the vacuum motor 18. When the vacuum motor 18 is activated on, fines and particulates located in vicinity of the vacuum inlet 6 pass into the canister inlet 30 and towards the outlet 13, but are contained in the vacuum canister 3. The vacuum canister 3 is an additional container for collecting and holding fines and particulates. The fines and particulates are pulled into the vacuum canister 3 by the vacuum motor 18. The fines and particulates are sorted from the passing vacuum air A by the pre-motor filter 2 and contained within the vacuum canister 3. The vacuum canister 3 is separately removable and emptied (from empty of the trash bin 4). The vacuum canister 3 collects the fines and particulates, and the trash bin 4 is segregated from the vacuum in connection as a unit. This causes the vacuum canister 3 to contain fines and particulates, and these are therefore not deposited in the trash bin 4 where these would disperse when the bin 4 is opened, such as for empty of trash of the bin 4 or otherwise.

In certain non-exclusive embodiments, the system 100 includes a trash bin sensor 5, a vacuum manual activation button 8, a vacuum inlet sensor 7 (not shown in FIG. 1, and positioned to activate when movement occurs in vicinity of the inlet 6), and/or a trash bin lid power button 16. As such the vacuum motor 18 may be activated on and off by the vacuum manual activation button 8, the vacuum inlet sensor 7, and/or otherwise. The trash bin lid 15 may be activated by the trash bin sensor 5, and also the trash bin 4 may include a trash bin lid power switch 16. Other and varied alternatives are possible for switching and control of the system 100, and the embodiments are mere non-exclusive examples. In each case, the vacuum canister 3 is included in order to catch and retain fines and particulates from vacuum through the inlet 6, and the segregated trash bin 4 of the unit can contain larger trash deposited in an upper opening of the bin 4. Opening or emptying of the trash bin 4 causes limited dispersion, because fines and particulates are instead vacuumed into the vacuum canister 3.

Figure 2:
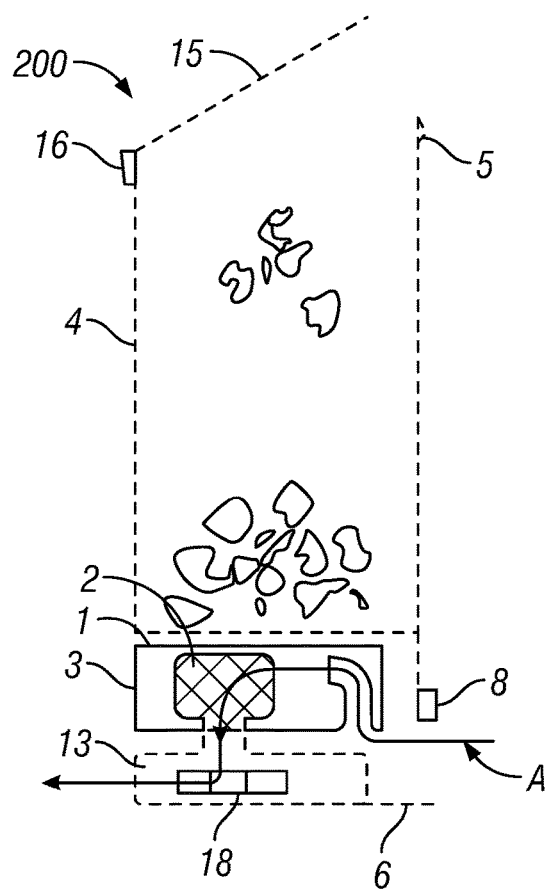
FIG. 2 illustrates vacuum air flow in the system of claim 1, according to certain embodiments of the invention.

Referring to FIG. 2, in conjunction with FIG. 1, a system 200 provides a vacuum air flow A, or as otherwise in embodiments. The air flow A occurs when the vacuum motor 18 is activated to on. The air flow A, drawing fines and particulates in vicinity of the inlet 6, pass initially into the inlet 6. The air flow A, with the fines and particulates, then passes into the canister inlet 30 of the vacuum canister 3. In the vacuum canister 3, fines and particulates are captured and contained. The vacuum canister 3 internally houses the pre-motor filter 2. The vacuum canister 3 is spacious to provide space for retention of the fines and particulates. The fines and particulates do not pass through the pre-motor filter 2 and are retained in the vacuum canister 3. The air flow A, after leaving fines and particulates in the vacuum canister 3, passes to the vacuum motor 18 and thereafter exhausts through the outlet 13. The outlet 13 may include an exhaust filter 14 (not shown in FIG. 2).

Figure 3:
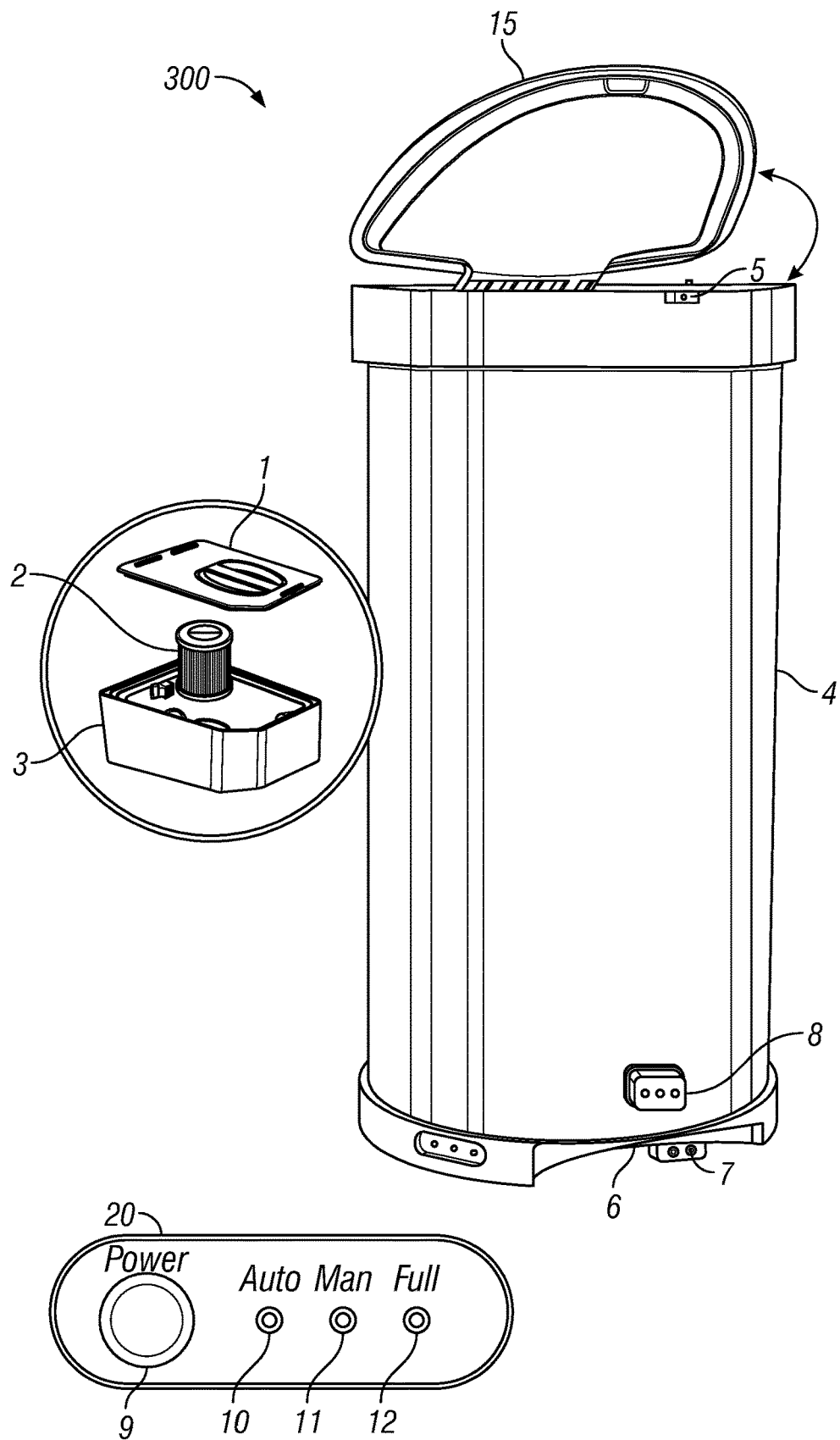
FIG. 3 illustrates a front and left side perspective view of a system including a vacuum canister with vacuum connected as a unit to a segregated trash bin, according to certain embodiments of the invention.
Figure 3A:
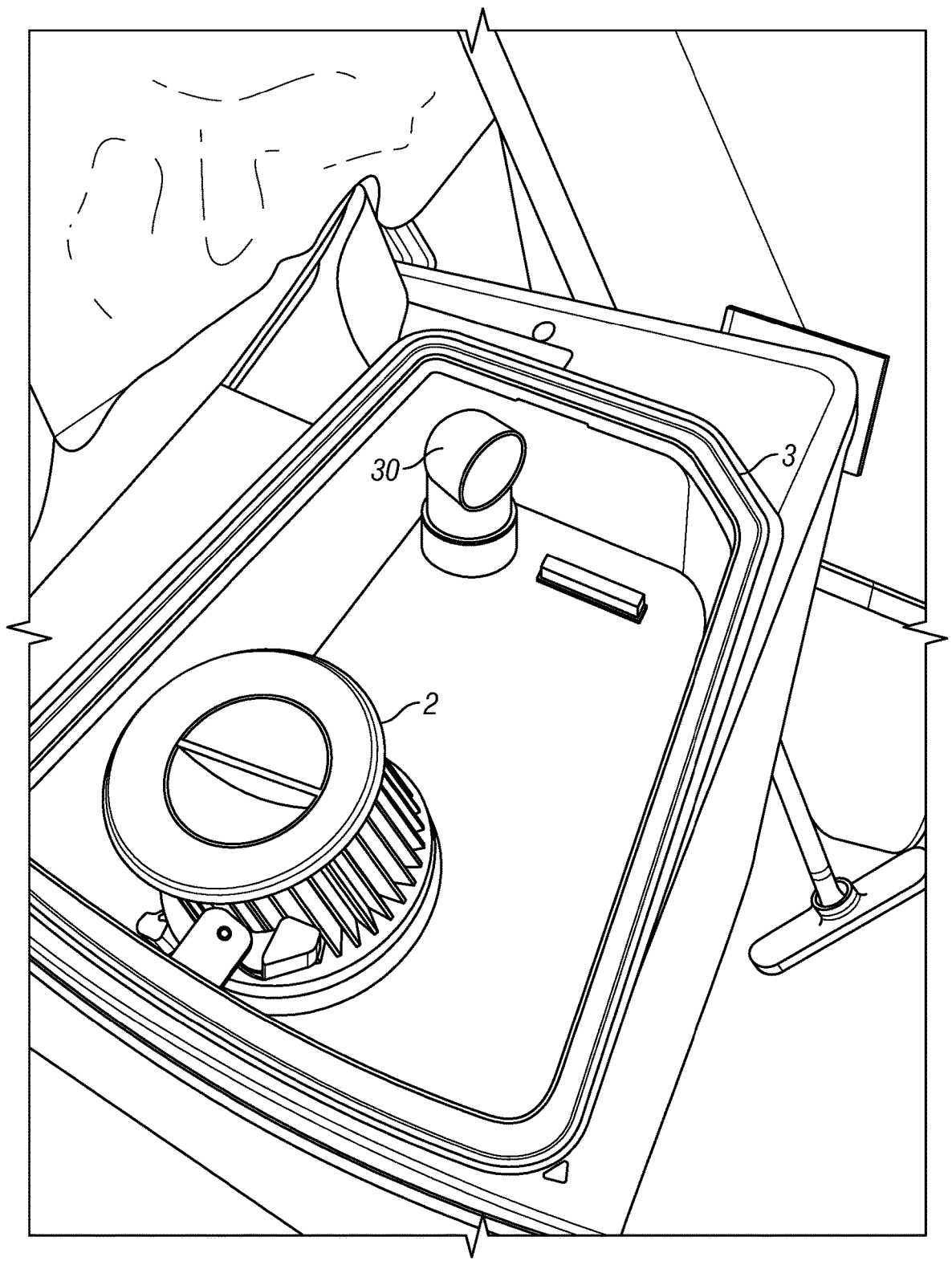
FIG. 3A illustrates the vacuum canister of FIG. 3, disconnected from engagement to the segregated trash bin and with the canister lid of the vacuum canister removed, according to certain embodiments.
Figure 4A:
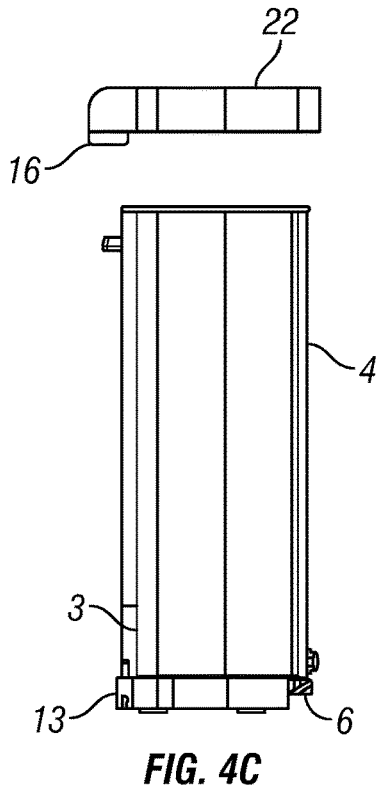
FIG. 4A illustrates a front view of a system of a vacuum canister connected to the segregated trash bin, including sensors and button, according to certain embodiments of the invention.
Figure 4B:
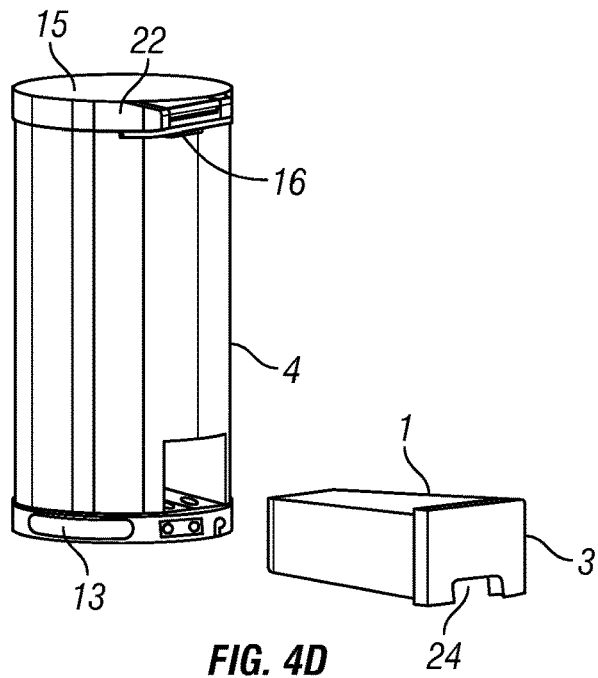
FIG. 4B illustrates a side view of the system of FIG. 4A, with an open lid of the trash bin, according to certain embodiments of the invention.
Figure 4C:
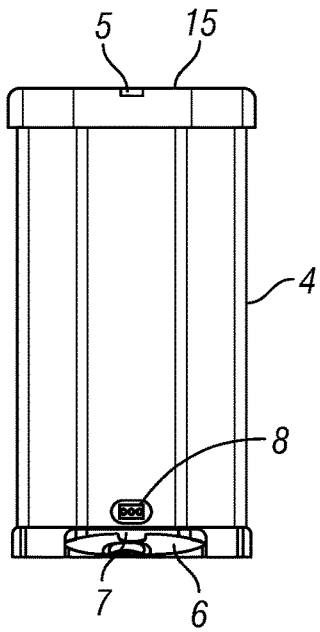
FIG. 4C illustrates the side view of FIG. 4B with a collar removed from atop the trash bin, according to certain embodiments of the invention.
Figure 4D:
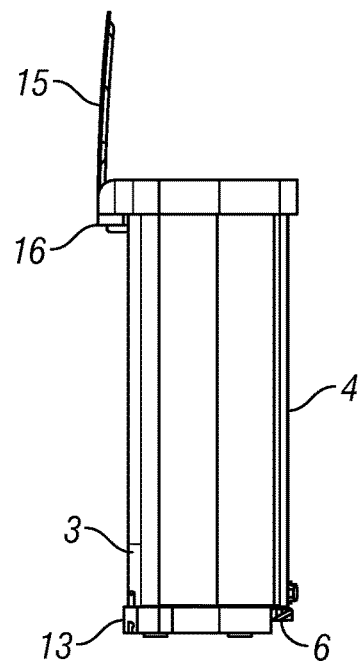
FIG. 4D illustrates a front and left side perspective view of the system of FIG. 4A, with the vacuum canister removed from connection to the segregated trash bin, according to certain embodiments of the invention.
Figure 4E:
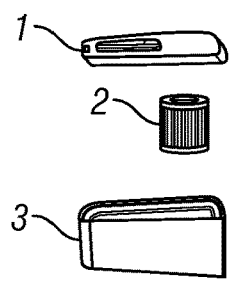
FIG. 4E illustrates a side view of the vacuum canister of the system of FIG. 4A, according to certain embodiments of the invention.

Referring to FIG. 3, in conjunction with FIGS. 1 and 2, a system 300 includes the vacuum canister 3 with lid 1 and pre-motor filter 2. The segregated trash bin 4 includes the bin lid 15, such as a hinged open and close lid, for access into the trash bin 4. The bin 4, in the non-exclusive embodiment, includes the bin sensor 5 for automatically opening and closing the lid 15 responsive to movement in vicinity of the sensor 5. The vacuum motor 18 can be activated, in the non-exclusive embodiment, either manually by the manual vacuum activation button 8 or automatically by the vacuum sensor 7 on movement near the inlet 6.

A control panel 20 may also be included in the system 300. The control panel 20 may include a vacuum power button 9, a vacuum auto mode button 10, a vacuum manual mode button 11, and a vacuum canister full indicator 12, as well as any other or different control devices. The vacuum canister 3 is engagedly connectable as a combined unit to the segregated trash bin 4 at a back side (in orientation of FIG. 3) of the combined unit. Within the vacuum canister 3 is maintained the pre-motor filter 2, which may be fixed, replaceable or cleanable according to desired implementation of the embodiment. The canister lid 1 is placed on the vacuum canister 3 when the canister 3 is placed in connection to the bin 4. When the canister 3 is disengaged from connection to the bin 4, the canister lid 1 may be removed or opened in manner to allow empty of vacuumed contents of the canister 3 and for maintenance of the pre-motor filter 2.

Referring to FIG. 4 A-E, in conjunction with FIGS. 1-3, a system 400 includes the trash bin 4 and the trash bin sensor 5 of a collar 22 sitting atop the bin 4. The system 400 of FIG. 4A is a front view showing the inlet 6 of the segregated vacuum of the combined unit, the vacuum sensor 7 and the vacuum manual activation button 8, as well as the exhaust 13 of the vacuum. The system 400 in FIG. 4B is a side view showing the vacuum canister 3 connected as a combined unit to the segregated trash bin 4. The lid 15 and the trash bin lid power button 16 are also shown. The system 400 of FIG. 4C is the side view with the collar 22 removed from the bin 4. The system 400 of FIG. 4D is a back perspective view of the trash bin 4 with the vacuum canister 3 removed from engagement as a combined unit to the segregated trash bin 4. FIG. 4E is a side view of the vacuum canister 3 and with the canister lid 1 and pre-motor filter 2 removed.

Figure 5:
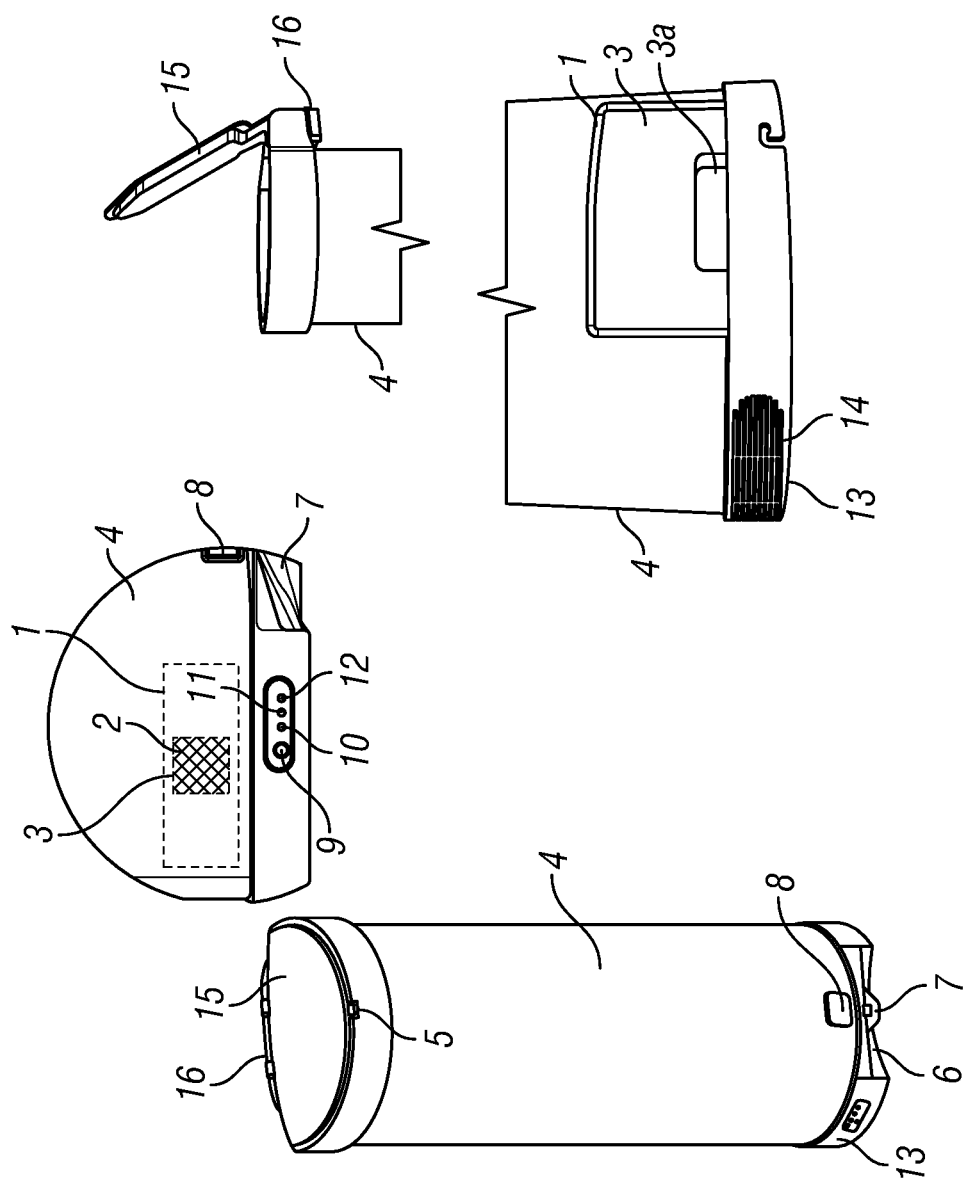
FIGS. 5 and 6 illustrate features of a vacuum canister and vacuum connected as a unit to a segregated trash bin, according to certain embodiments of the invention.
Figure 5:
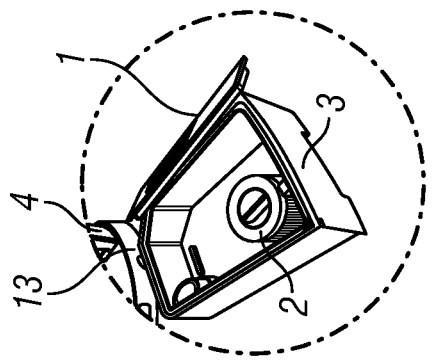
Figure 6:
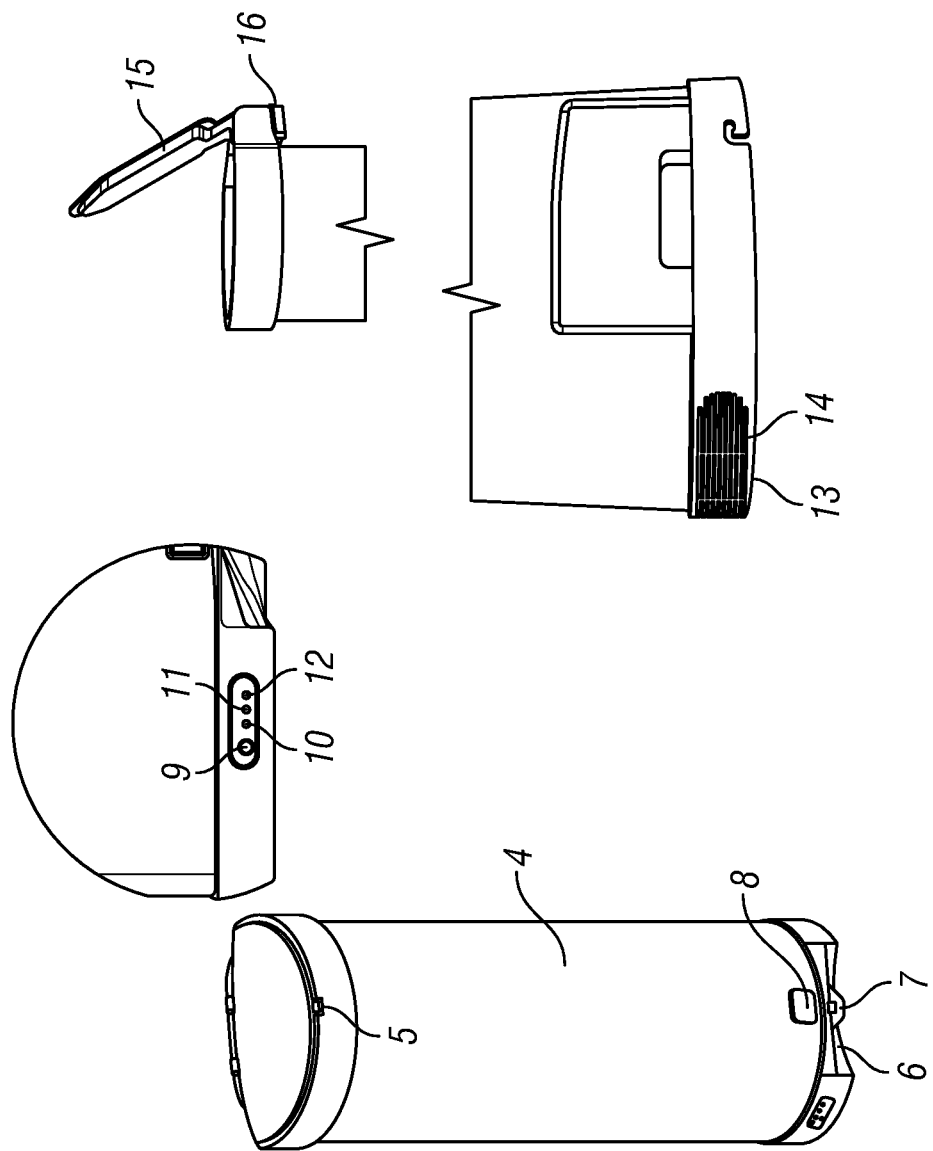
Figure 6:
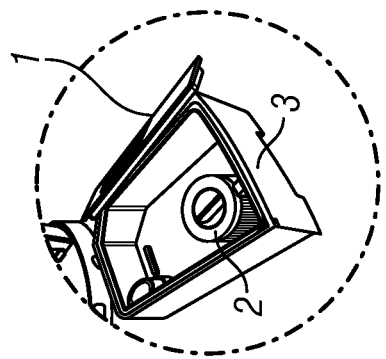

Referring to FIGS. 5 and 6, in conjunction with FIGS. 1-3 and 4 A-E, the vacuum canister 3 has the lid 1 and internally the pre-motor filter 2. The vacuum canister 3 may also include a handle 3a for grasping the canister 3 to remove it from the bin 4.

As will be understood, wide variation is possible in the foregoing embodiments. Although elements or units may be illustrated as standalone and unitary, the elements or units may alternately be comprised of more than one piece or part as desired in the implementation. Variation is also possible in the operations. Although certain operations and programming are disclosed, numerous other steps, operations, processes and methods may be implemented in the systems.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system, comprising:
   a vacuum canister;
   a vacuum motor connected to the vacuum canister for drawing fines and particulates to the vacuum canister; and
   a trash bin combinable as a segregated unit with the vacuum canister, where the fines and particulates from vacuum are sealingly contained in the vacuum canister, and where debris larger than the vacuumed fines and particulates is depositable in the trash bin separated from the fines and particulates;
   wherein the vacuum motor is connected to and remains connected to the trash bin upon removal of the vacuum canister from connection to the trash bin.

* * * * *